(12) United States Patent
Brooks et al.

(10) Patent No.: US 9,342,853 B2
(45) Date of Patent: May 17, 2016

(54) SOCIAL NETWORK PRUNING

(71) Applicant: International Business Machines Corporation, Armonk, NY (US)

(72) Inventors: David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/769,576

(22) Filed: Feb. 18, 2013

(65) Prior Publication Data
US 2014/0237040 A1    Aug. 21, 2014

(51) Int. Cl.
G06Q 50/00    (2012.01)
G06Q 10/06    (2012.01)
G06Q 10/10    (2012.01)

(52) U.S. Cl.
CPC ............. *G06Q 50/01* (2013.01); *G06Q 10/06* (2013.01); *G06Q 10/10* (2013.01)

(58) Field of Classification Search
CPC .............................. G06Q 50/01; G06Q 10/10
USPC .......................................... 709/204; 705/319
See application file for complete search history.

(56) References Cited

U.S. PATENT DOCUMENTS

| | | | |
|---|---|---|---|
| 7,725,525 B2 * | 5/2010 | Work | G06Q 10/10 707/726 |
| 8,024,431 B2 | 9/2011 | Hoffman | |
| 8,209,416 B2 | 6/2012 | Hoffman | |
| 9,020,965 B1 * | 4/2015 | Sehrer | G06F 17/3053 707/758 |
| 2006/0242234 A1 | 10/2006 | Counts et al. | |
| 2008/0040475 A1 * | 2/2008 | Bosworth et al. | 709/224 |
| 2008/0065758 A1 | 3/2008 | Narayanaswami | |
| 2008/0235337 A1 | 9/2008 | Sarkar et al. | |
| 2009/0164574 A1 | 6/2009 | Hoffman | |
| 2010/0094837 A1 | 4/2010 | O'Sullivan et al. | |
| 2011/0167115 A1 | 7/2011 | Gilbert et al. | |
| 2012/0011204 A1 | 1/2012 | Morin et al. | |
| 2012/0072580 A1 | 3/2012 | Hoffman | |
| 2012/0166532 A1 * | 6/2012 | Juan et al. | 709/204 |
| 2012/0271885 A1 | 10/2012 | Hoffman | |
| 2012/0284341 A1 * | 11/2012 | Masood et al. | 709/205 |
| 2013/0212173 A1 * | 8/2013 | Carthcart et al. | 709/204 |

* cited by examiner

Primary Examiner — Brendan Higa
Assistant Examiner — Leon Y Tseng
(74) Attorney, Agent, or Firm — Jason H. Sosa (57) ABSTRACT

A social networking service is provided, the social networking service having a user with a social connection to a first contact within a social network of the user and a social connection to a second contact with the social network of the user, wherein the first contact has a separate social connection to the second contact within a social network of the first contact. A computer system determines that the first contact has lowered a strength of the social connection to the second contact within the social network of the first contact. Based, at least in part, on the lowering of the strength of the social connection to the second contact within the social network of the first contact, the computer system recommends, to the user, to lower a strength of the social connection to the second contact within the social network of the user.

14 Claims, 4 Drawing Sheets

SOCIAL NETWORK PRUNING

FIELD OF THE INVENTION

The present invention relates generally to the field of social media, and more particularly, to managing contacts within a social network.

BACKGROUND OF THE INVENTION

A social networking service is an online service, platform, or website that focuses on facilitating the building of social networks or social relations among people who, for example, share interests, activities, backgrounds, or real-life connections. A social networking service may provide a representation of each user (often a profile), social links or contacts connecting the user to other users, and a variety of additional services. Generally, social networking services provide the ability for users to interact on the Internet. Exemplary services include chat applications, instant messaging applications, e-mail programs, and social networking websites and communities such as Facebook® and Google+®. With some services, all contacts are treated equally—a user either has a relationship with another user (e.g., listed as a "contact" or "friend") or does not. Other services provide the ability to categorize contacts according to different types of relationships. Such relationships may have different "tie strengths," a term used in social science to describe the closeness or strength of a relationship. For example, loose acquaintances may be considered "weak" ties, while trusted friends and family may be considered "strong" ties. The category of a contact may have an effect on the type of information that may be sent to the contact or that the contact may have access to, via the social networking service, regarding the user.

SUMMARY

Embodiments of the present invention include a method, computer program product, and system for managing contacts within a social network. In one embodiment, at least one social networking service is provided having a user, the user having a social connection to a first contact within a social network of the user and a social connection to a second contact within the social network of the user, wherein the first contact has a separate social connection to the second contact within a social network of the first contact. A computer system determines that the first contact has lowered a strength of the social connection to the second contact within the social network of the first contact. Based, at least in part, on the lowering of the strength of the social connection to the second contact within the social network of the first contact, the computer system recommends, to the user, to lower a strength of the social connection to the second contact within the social network of the user.

DETAILED DESCRIPTION

Embodiments of the present invention recognize that social media applications, including social networking services, have increased in popularity and become prevalent in both the consumer space and in business. One advantage of this prevalence includes the ability to send or share information to an entire group of relevant connections. Categories to which a contact belongs may dictate the information and/or types of information that a contact may receive, access, and view. However, relationships change, especially in a business context where people may change job roles, leave companies, etc., and shared information may not be appropriate for a contact subsequent to such a change. While many social networking services encourage growing a user's social network and provide many recommendations of other users that may be added as contacts, these services do not typically provide recommendations of contacts to pare off. Embodiments of the present invention provide the capability to recognize indications of potential changes in relationship between a user and a connected individual or contact, and inform the user of such potential changes. Certain embodiments of the invention may also provide recommendations to lower the strength of the connection or relationship (for example by changing the category to which the contact belongs), or even to completely remove the contact from the user's social network.

Implementation of such embodiments may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
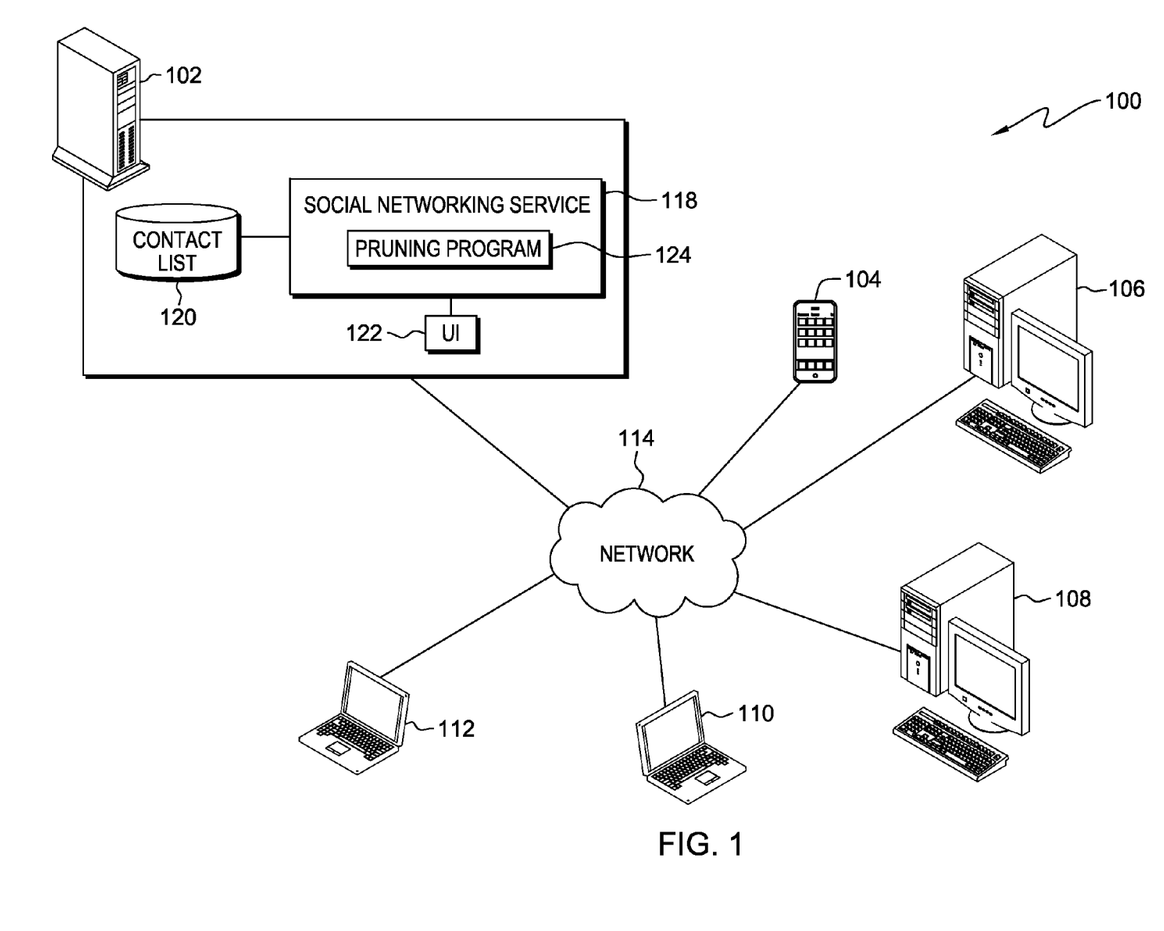
FIG. 1 is a functional block diagram illustrating a distributed data processing system in accordance with one embodiment of the present invention.

FIG. 1 is a functional block diagram illustrating a distributed data processing system, generally designated 100, in accordance with one embodiment of the present invention. Distributed data processing system 100 includes computers 102, 104, 106, 108, 110, and 112 interconnected over network 114.

Computer 102 may be a desktop computer, a laptop computer, a tablet computer, a specialized computer server, a smartphone, or any other computer system known in the art. In certain embodiments, computer 102 represents a computer system utilizing clustered computers and components that act as a single pool of seamless resources when accessed through network 114, as is common in data centers and with cloud computing applications. In general, computer 102 is representative of any programmable electronic device or combination of programmable electronic devices capable of executing machine-readable program instructions and communicating with other computing devices via a network. Exemplary components of computer 102 are described in greater detail with regard to FIG. 4.

In various embodiments of the present invention, computers 104, 106, 108, 110, and 112 can each respectively be a laptop computer, a tablet computer, a netbook computer, a personal computer (PC), a desktop computer, a personal digital assistant (PDA), a smartphone, or any programmable electronic device capable of communicating with computer 102 via network 114.

In general, network 114 can be any combination of connections and protocols that will support communications between computer 102 and computers 104, 106, 108, 110, and 112. Network 114 can include, for example, a local area network (LAN), a wide area network (WAN) such as the internet, a cellular network, or any combination of the preceding, and can further include wired, wireless, and/or fiber optic connections.

Social networking service 118 resides on computer 102 and facilitates the maintenance of social contacts, e.g., contact list 120, and communication or sharing of information between such contacts. As used herein, "social" contacts or connections may also refer to business or work related contacts. In one embodiment, computer 102 is a server computer system accessible to a plurality of users of social networking service 118, e.g. the respective users of computers 104-112, and social networking service 118 is a server application maintaining separate contact lists, e.g. contact lists 120, for each respective user of computers 104-112 and facilitating communication between the users. In such an embodiment, user interface 122 may be a web-based user interface accessible to each respective user via network 114. In an alternate embodiment, computer 102 is a client computer operated by a user of social networking service 118, and social networking service 118 is a client application facilitating communication with contacts of the user of computer 102, e.g. respective users of computers 104-112. Received communications and information may be displayed to the user of computer 102 through user interface 122 and messages and instructions may be received from the user through user interface 122.

Pruning program 124 monitors the status and/or other information of each of the users of social networking service 118, the treatment and organization of contacts by each of the users, and the interaction between the users. Based upon results of such monitoring, pruning program 124 recommends, to a user, contacts of the user to downgrade to a lower strength category and/or to remove as a contact. An exemplary implementation of pruning program 124 is discussed with regard to FIG. 3.

As depicted, pruning program 124 is a subprogram or routine of social networking service 118. In an alternative embodiment, pruning program 124 may be independent of social networking service 118 and capable of communicating or interacting with social networking service 118. In some embodiments, pruning program 124 may monitor contact statuses and interactions from multiple social networking services to gather additional information for recommendations to a user.

Figure 2:
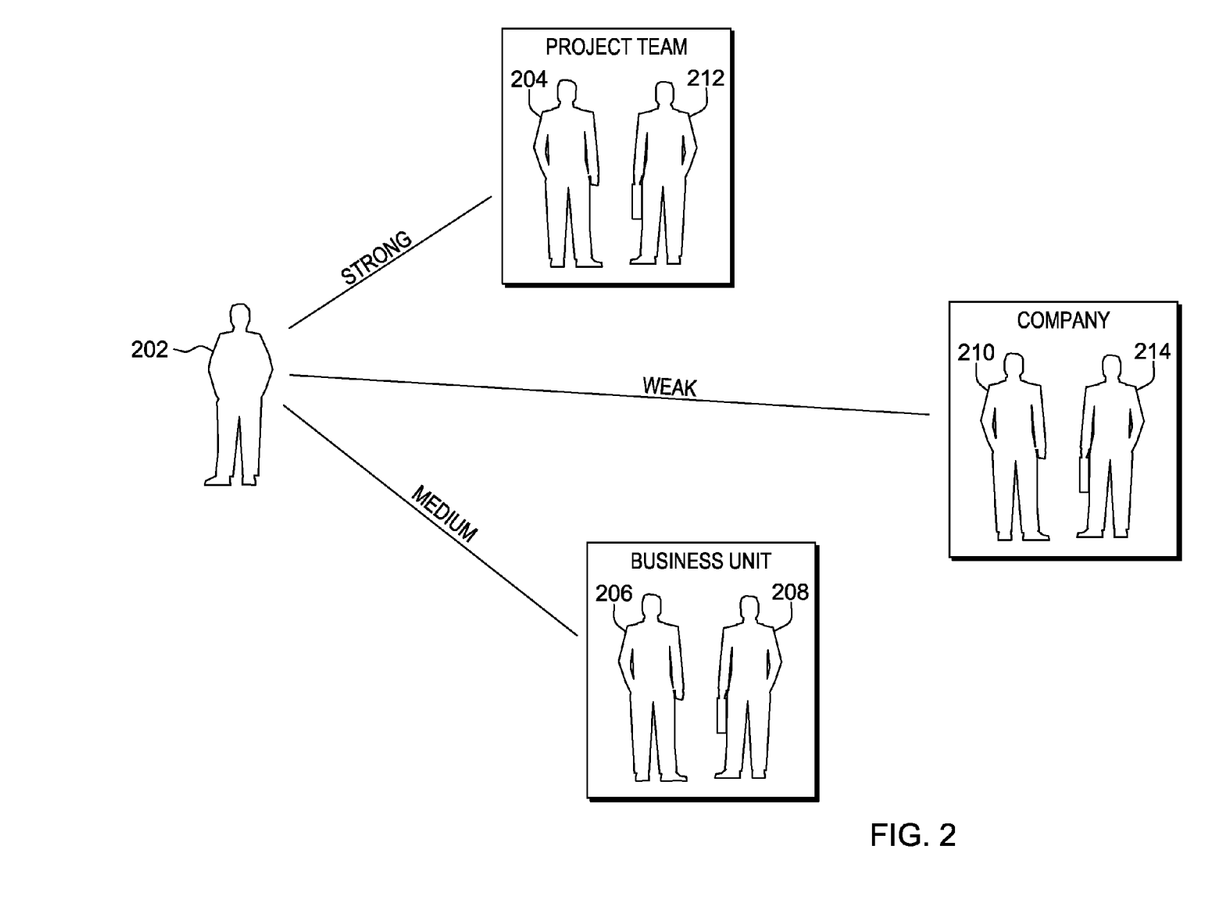
FIG. 2 depicts an exemplary grouping of user contacts by tie strength.

FIG. 2 depicts an exemplary grouping of user contacts by tie strength. In the depicted example, user 202 is connected, via a social networking service, with users 204, 206, 208, 210, 212, and 214. For purposes of discussion, users 202, 204, 206, 208, 210, 212, and 214 may be respective users of computers 104, 106, 108, 110, 112, and one or more additional computer systems capable of accessing social networking service 118 on computer 102. As depicted, each user connected to user 202 is grouped in categories having different tie strengths. Users 204 and 212 are in the category "project team," users 206 and 208 fall within a "business unit" category, and users 210 and 214 are in a "company" category. Members of the "project team" category have the strongest connection to user 202, followed by the "business unit" category, and then the "company" category. In this example, based on the tie strengths of these categories, users 204 and 212 have access to more information from user 202 than do users 206 and 208. Similarly, users 206 and 208 have access to more information from user 202 than do users 210 and 214.

Figure 3:
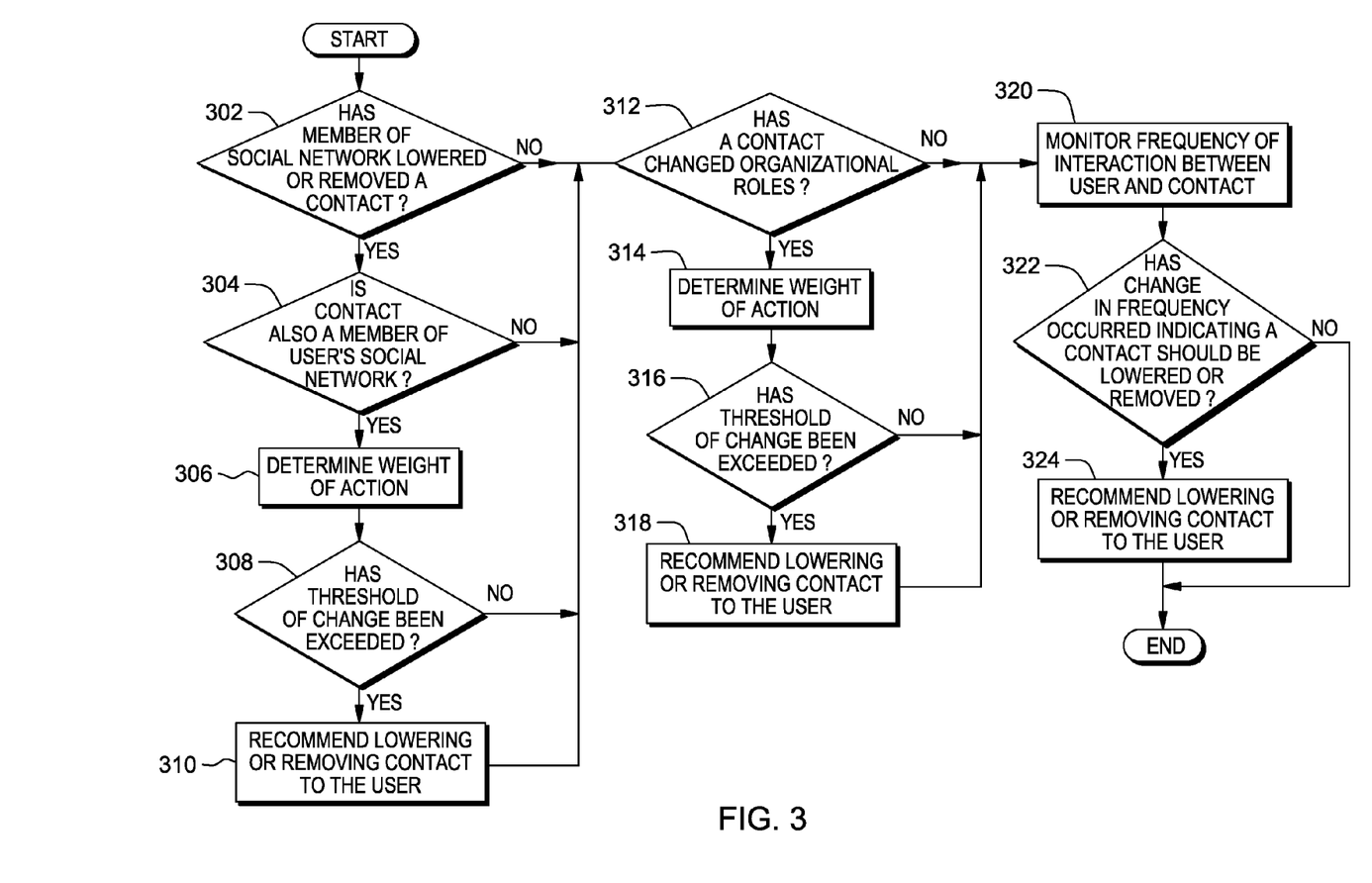
FIG. 3 is a flowchart depicting operational steps of one exemplary implementation of a pruning program for providing recommendations of contacts to lower or remove, in accordance with an embodiment of the present invention.

FIG. 3 is a flowchart depicting operational steps of one exemplary implementation of pruning program 124, in accordance with an embodiment of the present invention.

In one embodiment, pruning program 124 uses any number of factors to determine whether to recommend the lowering or removal of a contact of a user. These factors may include changing of the connection (tie) strength of a contact by other members of a user's social network; organizational changes of a contact; and frequency of interaction with a contact. In a preferred embodiment, pruning program 124 uses a combination of all three aforementioned factors.

Pruning program 124 determines whether a member of a user's social network has lowered or removed a contact (decision 302). In one embodiment, any time a user of social networking service, such as social networking service 118, changes the position or category of a contact, the service may automatically notify pruning program 124. In another embodiment, pruning program 124 may actively and periodically query the social networking service (or multiple social networking services) for any changes in contact connections. If pruning program 124 determines that a member of the user's social network has lowered the strength of a contact or removed the contact from the member's social network, pruning program 124 determines whether the lowered or removed contact is also a member of the user's social network (decision 304). If the lowered or removed contact is a member of the user's social network, pruning program 124 determines whether to recommend that the user also lower or remove the contact. An exemplary implementation of this determination is described with respect to steps 306-310.

In step 306, pruning program 124 determines a relative weight of the action. In one embodiment, any lowering in tie strength of one contact by another member may warrant a recommendation for the user to follow suit. However, embodiments of the present invention recognize that different actions by different members of the user's social network may have varying degrees of importance to the user. For example, actions by a person close to the user (as measured by tie strength) are generally more pertinent to the user than actions by a person with whom the user's connection is weak. In one embodiment, the stronger the connection between the user and a member of the user's social network, the higher the weight of any actions, e.g., the lowering of tie strength of a contact, taken by the member. As an illustration, users 210 and 214 of FIG. 2, having the weakest connection with user 202, might have a weighting factor of '1' relative to user 202. Users 206 and 208 might have a weighting factor of '2,' and users 204 and 212 might have a weighting factor of '3.'

In another example, larger degrees of change may also be pertinent. For example, a member of the user's social network lowering the tie strength of a contact by a category may have less impact than the member lowering the tie strength by three categories or completely removing the contact. In one embodiment of the present invention, the larger the degree of change caused by the action, the higher the weight of the action. In a preferred embodiment, both the tie strength of the member of the user's social network taking the action, and the degree of the change, contribute to the relative weight of the action. Therefore, drastic changes by those closest to the user will have the highest impact, and minimal changes by the weakest connections will have the smallest impact.

Based on the weight of the action, pruning program 124 determines whether a threshold of change has been exceeded (step 308). In one embodiment, if the weight of the action meets or exceeds a predefined threshold, pruning program 124 recommends lowering or removing the contact to the user (step 310). In a second embodiment, in recognition that a plurality of smaller actions may indicate that lowering a contact should be considered, a cumulative value or score may be maintained by pruning program 124 for every contact relative to the user. In this embodiment, the weight of the action is added to the cumulative value corresponding to the contact, and if the cumulative value meets or exceeds a predefined threshold, pruning program 124 recommends lowering or removing the contact to the user (step 310). Thus, for example, multiple people lowering the tie strength of the contact may trigger a recommendation to follow suit to the user, where a single person lowering the tie strength may not. In a third embodiment, each contact in the user's social network may have a value indicative and proportional to the strength of the connection. This value may be referred to herein as the "connection strength" between a contact and a user. The connection strength may be based on a number of factors including, for example, number of contacts in common and other contacts' ranking of the contact. In this embodiment, when a member of the user's social network lowers or removes a contact, the weight of the action may dictate a change in connection strength between the user and the contact. Pruning program 124 may compare the new connection strength to an average connection strength or range of connection strength corresponding to various categories of contacts. If the connection strength falls below the average connection strength or range of connection strengths in a category to which the contact currently belongs, or presents a better match to a lower category, pruning program 124 recommends lowering or removing the contact to the user (step 310). A user of ordinary skill in the art will recognize that variations on weighting the relationship of contacts and/or weighting actions of members of the user's social network may be used without deviating from the scope and spirit of the present invention as set forth in the claims.

The recommendation to lower or remove the contact may, in one embodiment, simply suggest the user consider lowering or removing the contact. In another embodiment, pruning program 124 may also provide to the user reasons for the recommendation. For example, pruning program 124 may display, along with the recommendation, a list of user contacts that have recently lowered or removed the contact from their respective networks. In yet another embodiment, pruning program 124 may also recommend a category to place the contact in based on the various determined weights and/or connection strengths.

Pruning program 124 may also determine whether a contact of a user's social network has changed organizational roles or positions (decision 312). The change may be explicit or implicit. Examples of explicit changes to organizational roles include a changing in the contact's profile describing a job title, project team, or job responsibilities. An implicit change to organizational role may include a change in reporting structure (e.g., the people above and/or below the contact in the reporting structure), a change in a pay band, or any other indication of position change that doesn't explicitly describe the position change. In one embodiment, any time a user's profile is changed, the social networking service notifies pruning program 124, and pruning program 124 determines whether the change implicitly or explicitly indicates a change in organizational roles. In another embodiment, pruning program 124 may actively and periodically query the social networking service (or multiple social networking services) for any changes to member profiles.

If pruning program 124 determines that a contact of the user's social network has changed organizational roles, pruning program 124 determines whether to recommend that the user lower or remove the contact. An exemplary implementation of this determination is described with respect to steps 314-318.

In step 314, pruning program 124 determines a relative weight of the action. In one embodiment, any detected change may warrant a recommendation for the user to remove or lower the contact within the user's social network. However, embodiments of the present invention recognize that not every organizational change should instigate such a recommendation. In one embodiment, pruning program 124 compares the contact's original and changed organizational roles to the organizational roles of the contacts within the same category. The higher the percentage of contacts in the same category that have matching organizational roles, then the higher the weight of an action that changes the organizational role of the contact from a matching role to a non-matching role. In a second embodiment, as described previously, each contact in a user's social network may have an associated connection strength value. The connection strength may be based on a number of factors including, for example, organizational role. In one embodiment, this factor is in addition to the aforementioned factors of number of contacts in common and other contacts' ranking of the contact. In an example, each explicit job role may have a predetermined value relative to other job roles. Pruning program 124 may then measure the weight of the action by comparing the value of the contact's original job role, relative to the user's job role, to the value of the contact's new job role relative to the user's job role. As another example, the value that is attributed to the connection strength by a contact's organizational role may be based on the distance between the user and the contact within a reporting structure (e.g., how removed are the user and the contact from a common manager?). Thus, pruning program 124 may determine the weight of the change by calculating the difference between the original organizational closeness/distance value between the user and the member and the new value.

Based on the weight of the action, pruning program 124 determines whether a threshold of change has been exceeded (step 316). In one embodiment, if the weight of the action meets or exceeds a predefined threshold, pruning program 124 recommends lowering or removing the contact in the user's social network (step 318). In a second embodiment, the weight of the action is used to recalculate the connection strength between the user and the contact. If the connection strength falls below an average connection strength for the category to which the contact belongs, or presents a better match to a lower category, pruning program 124 recommends lowering or removing the contact to the user (step 318). By allowing organizational role to contribute to the connection strength, a combination of actions, including changing organizational roles and changing relationships between contacts, may all contribute to a determination to lower or remove a contact in the user's social network. A user of ordinary skill in the art will recognize that various schemes for weighting organizational roles and changes in organizational roles may be used without deviating from the scope and spirit of the present invention as set forth in the claims.

Pruning program 124 may also monitor frequency of interactions between the user and each of the user's contacts (step 320) and determine whether a change in frequency of interaction between the user and a contact indicates that the contact should be lowered or removed from the user's social network (decision 322). Interactions may include direct communication (e.g., email, instant messaging) and shared information accessible to the contact. In one embodiment, an indication that a contact should be lowered occurs if the frequency of interaction decreases by a specified percentage. In another embodiment, the frequency of interaction between the user and the contact contributes to the connection strength between the user and the contact. As the frequency decreases, the connection strength value is adjusted accordingly. If the connection strength falls below an average connection strength of the category to which the contact belongs, or presents a better match to a lower category, pruning program 124 recommends lowering or removing the contact (step 324).

Figure 4:
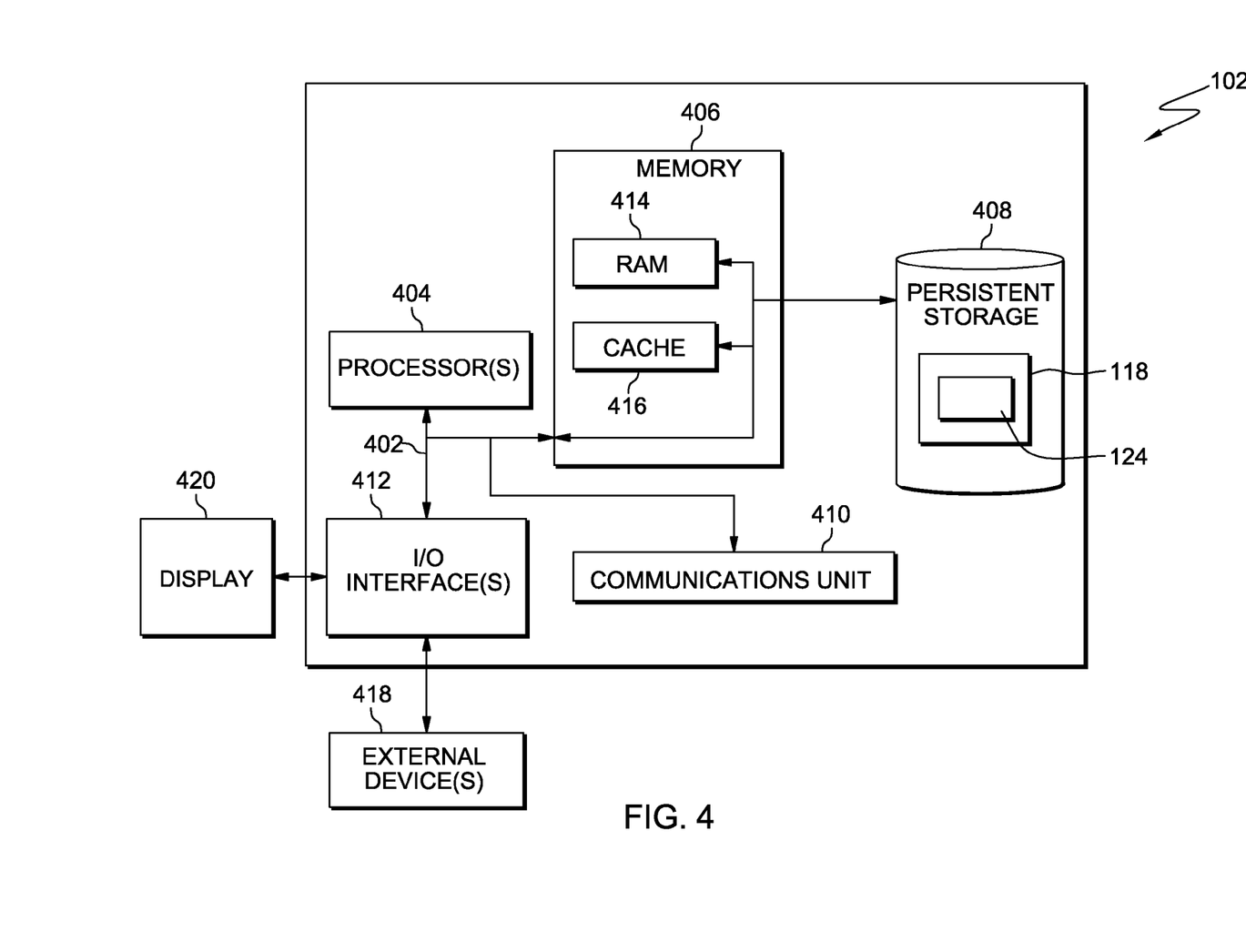
FIG. 4 depicts a block diagram of components of an exemplary computer system for implementing embodiments of the present invention.

FIG. 4 depicts a block diagram of components of computer 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. For example, computer 102 may comprise components spread through multiple systems and resources and may provide systems and resources beyond what is necessary to operate embodiments of the present invention.

Computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Social networking service 118 and pruning program 124 are stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by computer 102. In these examples, communications unit 410 includes one or more wireless network interface cards. Communications unit 410 may provide communications through the use of either or both physical and wireless communications links. Computer programs and processes, such as social networking service 118 and pruning program 124, may be downloaded to persistent storage 408 through communications unit 410.

I/O interface(s) 412 allows for input and output of data with other devices that may be connected to computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for managing contacts of a user of at least one social networking service, the user having a social connection to a first contact within a social network of the user and a social connection to a second contact within the social network of the user, wherein the first contact has a separate social connection to the second contact within a social network of the first contact, the computer program product comprising:
one or more non-transitory computer-readable storage media and program instructions stored on the one or more non-transitory computer-readable storage media, which when executed by a processor perform the actions of:
determining that the first contact has lowered a strength of the social connection to the second contact within the social network of the first contact, where strength of a social connection corresponds to a level or amount of access to information that one member of the social network has with regard to information shared by another member of the social network;
in response, determining a weight, based on a number of factors, corresponding to the action of the first contact lowering the strength of the social connection to the second contact, the number of factors including at least one of: strength of a social connection between the user and the first contact such that the stronger the social connection between the first contact and the user, the more weight is given to the action of the first contact lowering the strength of the social connection to the second contact, and a degree of change in the strength of the social connection between the first contact and the second contact as caused by the action such that the greater the change in access to information of the first contact allowed to the second contact, the more weight is given to the action of the first contact lowering the strength of the social connection to the second contact; and
based, at least in part, on the determined weight, recommending, to the user, to lower a strength of the social connection to the second contact within the social network of the user, such that the second contact has less access to information provided by the user within the social network.

2. The computer program product of claim 1, wherein the program instructions, when executed by a processor, further perform the actions of:
determining that a third contact having a social connection with the user within the social network of the user, has lowered a strength of social connection with the second contact within a social network of the third contact;
wherein:
the action of recommending, to the user, to lower the strength of the social connection to the second contact within the social network of the user, is based on both the weight corresponding to the action of the first contact lowering the strength of the social connection with the second contact, and a weight corresponding to the action of the third contact lowering of the strength of the social connection within the social network of the third contact.

3. The computer program product of claim 1, wherein the program instructions, when executed by a processor, further perform the actions of:
determining that the second contact has changed organizational roles;
wherein:
the action of recommending, to the user, to lower the strength of the social connection to the second contact within the social network of the user, is further based on a weight attributable to the changing of organizational roles.

4. The computer program product of claim 1, wherein the program instructions, when executed by a processor, further perform the actions of:
determining that frequency of interactions between the user and the second contact has reduced;
wherein:
the action of recommending, to the user, to lower the strength of the social connection to the second contact within the social network of the user, is further based on a weight attributable to the reduced frequency of interactions between the user and the second contact.

5. The computer program product of claim 1, wherein the program instructions, when executed by a processor, further perform the actions of:
- maintaining a value representative of the strength of the social connection between the user and the second contact, the value being based, in part, on a strength of social connection between one or more contacts of the user and the second contact in respective social networks of the one or more contacts of the user; and
- subsequent to determining that the first contact has lowered the strength of the social connection with the second contact within the social network of the first contact, updating the value representative of the strength of the social connection between the user and the second contact;

wherein:
- one factor of the number of factors contributing to the determined weight is the updated value representative of the strength of the social connection between the user and the second contact.

6. The computer program product of claim 5, wherein the value representative of the strength of the social connection between the user and the second contact is further based on an organizational role of the second contact and frequency of interaction between the user and the second contact.

7. A computer system for managing contacts of a user of at least one social networking service, the user having a social connection to a first contact within a social network of the user and a social connection to a second contact within the social network of the user, wherein the first contact has a separate social connection to the second contact within a social network of the first contact, the computer system comprising:
- one or more computer processors;
- one or more non-transitory computer-readable storage media;
- program instructions stored on at least one of the one or more non-transitory computer-readable storage media for execution by at least one of the one or more computer processors, which when executed by at least one of the one or more computer processors, perform the actions of:
- determining that the first contact has lowered a strength of the social connection to the second contact within the social network of the first contact, where strength of a social connection corresponds to a level or amount of access to information that one member of the social network has with regard to information shared by another member of the social network;
- in response, determining a weight, based on a number of factors, corresponding to the action of the first contact lowering the strength of the social connection to the second contact, the number of factors including at least one of: strength of a social connection between the user and the first contact such that the stronger the social connection between the first contact and the user, the more weight is given to the action of the first contact lowering the strength of the social connection to the second contact, and a degree of change in the strength of the social connection between the first contact and the second contact as caused by the action such that the greater the change in access to information of the first contact allowed to the second contact, the more weight is given to the action of the first contact lowering the strength of the social connection to the second contact; and
- based, at least in part, on the determined weight, recommending, to the user, to lower a strength of the social connection to the second contact within the social network of the user, such that the second contact has less access to information provided by the user within the social network.

8. The computer system of claim 7, wherein the program instructions, when executed by at least one of the one or more computer processors, further perform the actions of:
- determining that a third contact having a social connection with the user within the social network of the user, has lowered a strength of social connection with the second contact within a social network of the third contact;

wherein:
- the action of recommending, to the user, to lower the strength of the social connection to the second contact within the social network of the user, is based on both the weight corresponding to the action of the first contact lowering the strength of the social connection with the second contact, and a weight corresponding to the action of the third contact lowering of the strength of the social connection within the social network of the third contact.

9. The computer system of claim 7, wherein the program instructions, when executed by at least one of the one or more computer processors, further perform the actions of:
- determining that the second contact has changed organizational roles;

wherein:
- the action of recommending, to the user, to lower the strength of the social connection to the second contact within the social network of the user, is further based on a weight attributable to the changing of organizational roles.

10. The computer system of claim 7, wherein the program instructions, when executed by at least one of the one or more computer processors, further perform the actions of:
- determining that frequency of interactions between the user and the second contact has reduced;

wherein:
- the action of recommending, to the user, to lower the strength of the social connection to the second contact within the social network of the user, is further based on a weight attributable to the reduced frequency of interactions between the user and the second contact.

11. The computer system of claim 7, wherein the program instructions, when executed by at least one of the one or more computer processors, further perform the actions of:
- maintaining a value representative of the strength of the social connection between the user and the second contact, the value being based, in part, on a strength of social connection between one or more contacts of the user and the second contact in respective social networks of the one or more contacts of the user; and
- subsequent to determining that the first contact has lowered the strength of the social connection with the second contact within the social network of the first contact, updating the value representative of the strength of the social connection between the user and the second contact;

wherein:
- one factor of the number of factors contributing to the determined weight is the updated value representative of the strength of the social connection between the user and the second contact.

12. The computer system of claim 11, wherein the value representative of the strength of the social connection between the user and the second contact is further based on an organizational role of the second contact and frequency of interaction between the user and the second contact.

13. The computer program product of claim 3, wherein the number of factors upon which the weight is determined include both the strength of the social connection between the user and the first contact such that the stronger the social connection between the first contact and the user, the more weight is given to the action of the first contact lowering the strength of the social connection to the second contact, and the degree of change in the strength of the social connection between the first contact and the second contact as caused by the action such that the greater the change in access to information of the first contact allowed to the second contact, the more weight is given to the action of the first contact lowering the strength of the social connection to the second contact.

14. The computer system of claim 7, wherein the number of factors upon which the weight is determined include both the strength of the social connection between the user and the first contact such that the stronger the social connection between the first contact and the user, the more weight is given to the action of the first contact lowering the strength of the social connection to the second contact, and the degree of change in the strength of the social connection between the first contact and the second contact as caused by the action such that the greater the change in access to information of the first contact allowed to the second contact, the more weight is given to the action of the first contact lowering the strength of the social connection to the second contact.

\* \* \* \* \*